(No Model.) 9 Sheets—Sheet 1.

A. E. WHITEHEAD.
STAMP CANCELING MACHINE.

No. 596,098. Patented Dec. 28, 1897.

Fig. 1.

WITNESSES:
A. M. Parkins
Herbert Bradley

INVENTOR
A. E. Whitehead
BY
Dennis & Goldsborough
ATTORNEYS (No Model.) 9 Sheets—Sheet 4.

A. E. WHITEHEAD.
STAMP CANCELING MACHINE.

No. 596,098. Patented Dec. 28, 1897.

WITNESSES: INVENTOR
A. M. Parkins. A. E. Whitehead
Herbert Bradley. BY
 ATTORNEYS (No Model.) 9 Sheets—Sheet 5.

A. E. WHITEHEAD.
STAMP CANCELING MACHINE.

No. 596,098. Patented Dec. 28, 1897.

(No Model.) 9 Sheets—Sheet 6.

A. E. WHITEHEAD.
STAMP CANCELING MACHINE.

No. 596,098. Patented Dec. 28, 1897.

WITNESSES:
A. M. Parkins
Herbert Bradley

INVENTOR
A. E. Whitehead
BY
Penner Goldsborough
ATTORNEYS

THE NORRIS PETERS CO., PHOTO-LITHO., WASHINGTON, D. C.

(No Model.)

A. E. WHITEHEAD.
STAMP CANCELING MACHINE.

No. 596,098. Patented Dec. 28, 1897.

WITNESSES:
INVENTOR
A. E. Whitehead
BY
ATTORNEYS

(No Model.)  9 Sheets—Sheet 9.

A. E. WHITEHEAD.
STAMP CANCELING MACHINE.

No. 596,098. Patented Dec. 28, 1897.

Witnesses:

Inventor:
A. E. Whitehead,

UNITED STATES PATENT OFFICE.

ALFRED E. WHITEHEAD, OF BROOKLYN, NEW YORK.

STAMP-CANCELING MACHINE.

SPECIFICATION forming part of Letters Patent No. 596,098, dated December 28, 1897.

Application filed November 21, 1894. Serial No. 529,506. (No model.)

*To all whom it may concern:*

Be it known that I, ALFRED E. WHITEHEAD, a citizen of the United States of America, residing at Brooklyn, county of Kings, and State of New York, have invented certain new and useful Improvements in Stamp-Canceling Machines, of which the following is a specification.

This invention relates to stamp-canceling machines—that is to say, to machines adapted to handle mail-matter in post-offices and effectually cancel each of the postage-stamps thereof.

To aid in a more intelligent understanding of the improvements, a detailed description of a practical embodiment thereof will now be given, reference being had to the accompanying drawings, forming a part hereof.

In said drawings, Fig. 16 is an end elevation, partly in section.

The operative parts of the machine are mounted in a suitable framework A and consist in the main of a receptacle or feed-hopper B for a quantity of matter to be operated upon; a separating, timing, and gaging device C for separating individual pieces of matter from the receptacle into position to pass through the machine; a marking die or stamp D for printing or embossing the post-office name and date upon each piece of mail-matter; a stamp-canceling device E for removing or abrading the surface or body of the stamp or stamps on the mail-matter, and a discharge-chute F for directing the canceled stamped matter from the machine.

Figure 1:
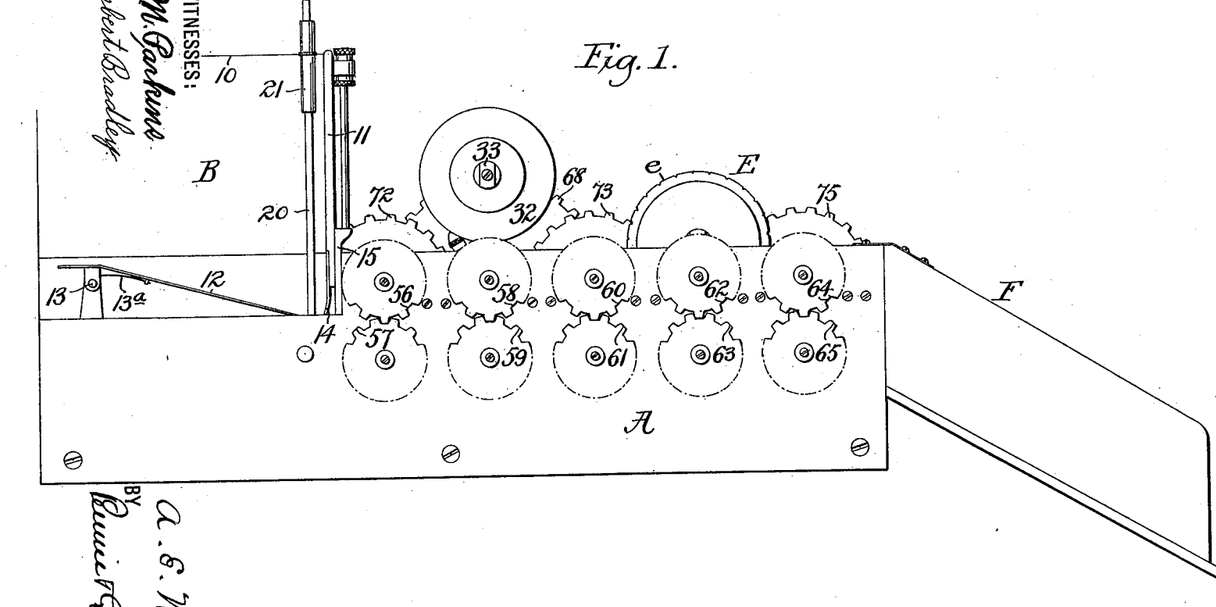
Figure 1 is a side elevation of a machine provided with the improvements, portions of many of the toothed wheels being indicated by dotted lines.
Figure 4:
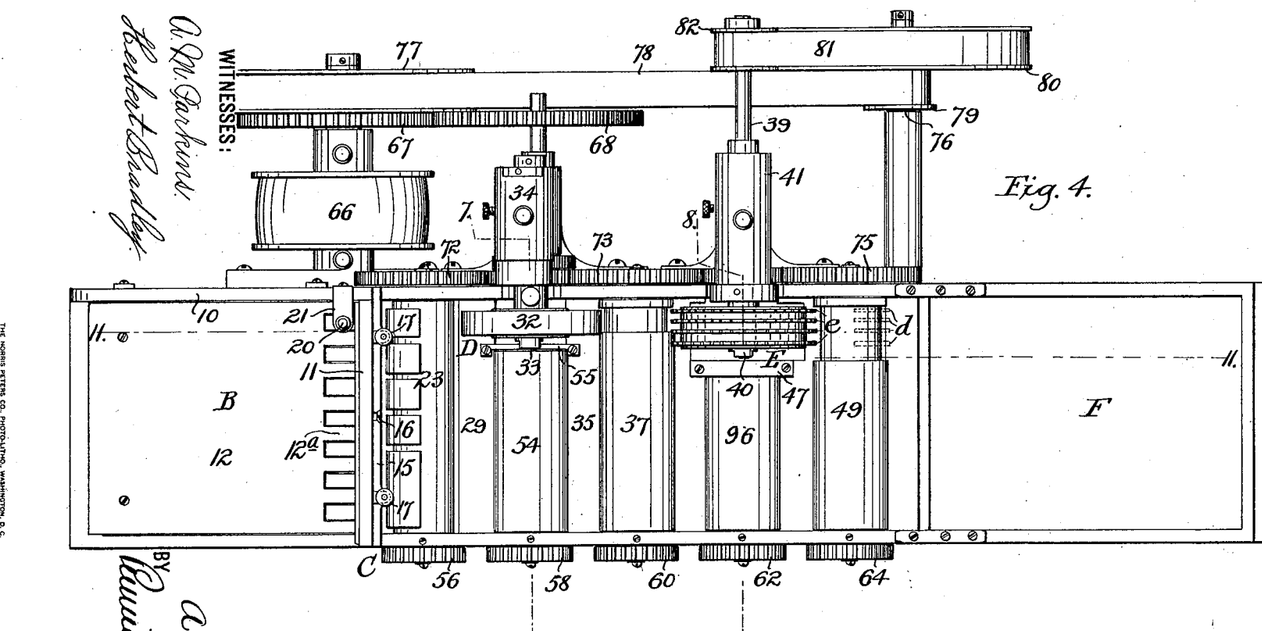
Fig. 4 is a plan view of the machine.
Figure 5:
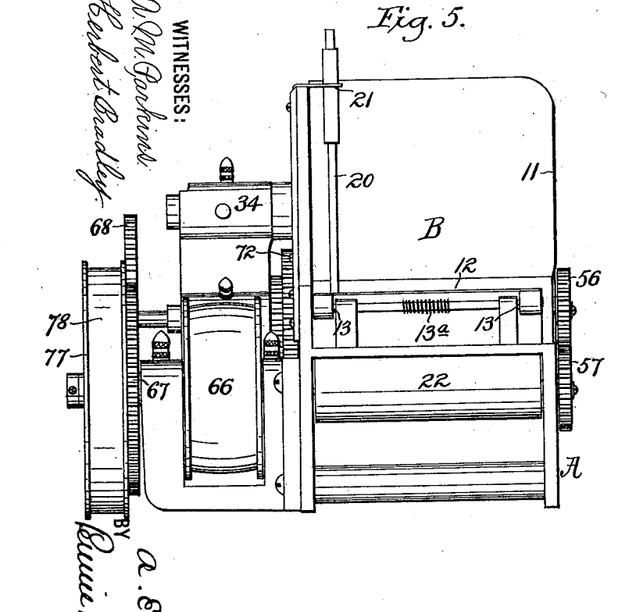
Fig. 5 is an end view thereof, looking from the left of Figs. 1 and 4, showing the feeding-in end of the machine.
Figure 6:
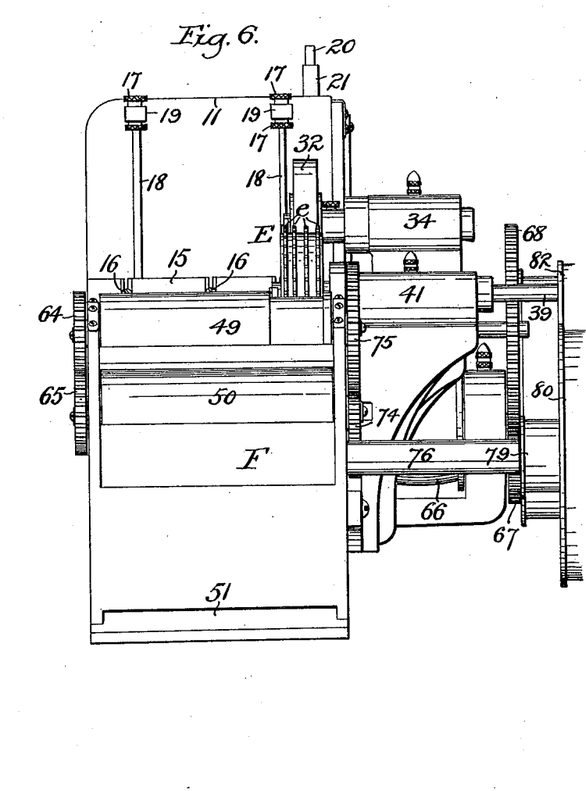
Fig. 6 is an end view thereof, looking from the right of Figs. 1 and 4, showing the delivery or discharge end of the machine.
Figures 11, 12:
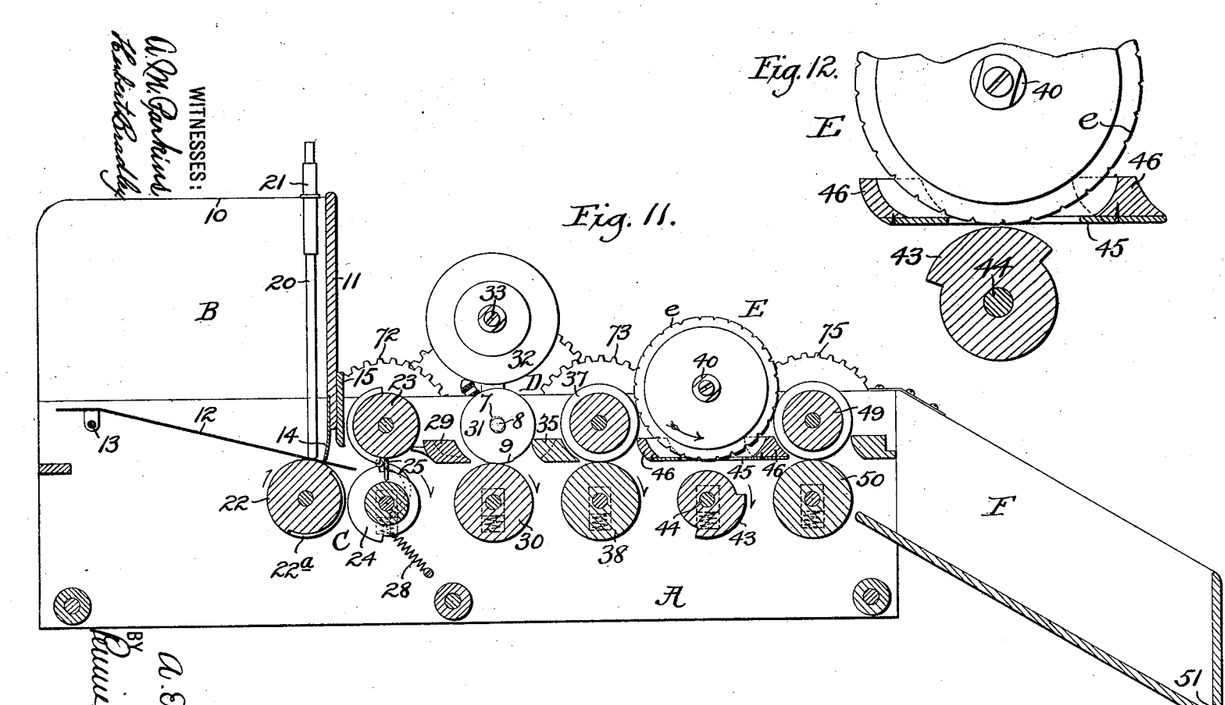
Fig. 11 is a longitudinal sectional elevation on the line 11 11 of Fig. 4.
Fig. 12 is an enlarged sectional elevation of the canceling bur or tool, its guard or grid, and the coacting roll removed from the machine.
Figure 13:
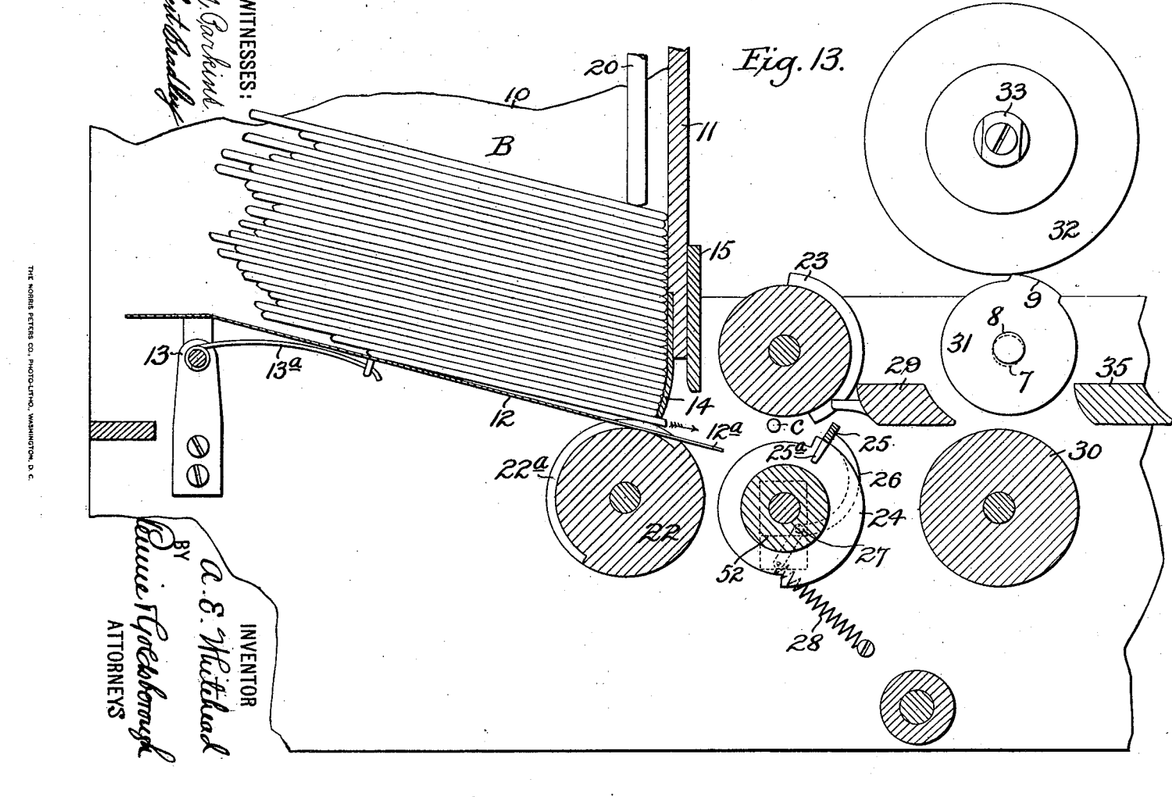
Fig. 13 is an enlarged sectional elevation of the feeding mechanism, showing a piece of mail-matter in the act of being fed.

The mail-matter receptacle B consists of a two-sided structure, one side 10 and an end 11, in which a quantity of mail-matter is deposited with its stamps uppermost and all disposed in the present instance at the farther right-hand corner of the receptacle, viewed from Figs. 1, 4, and 11, and resting upon the bottom of the receptacle, consisting of a movable plate 12, which is inclined downwardly from its rear end, the lowermost forward end of which projects slightly beyond the lower portion of the receptacle end 11 and serves as a guide for directing in its proper channel the piece of matter being fed. This movable plate is mounted at its rear end on a pivot 13, allowing its front portion to rise and fall to open and close the mouth of the receptacle formed by the end of said plate and the lower edge of the receptacle end 11. Instead, however, of extending the receptacle end down to or adjacent to the plate its lower portion is continued by a flexible down-hanging guard 14, which is capable of yielding to allow the passage of relatively thicker pieces of matter than the opening formed by the movement of the plate from the lower edge of the guard would ordinarily permit. It is, however, desirable to provide means for regulating the width of opening of the mouth formed between the guard 14 and the plate 12, irrespective of the yielding capacity of the guard, and for this purpose the receptacle end 11 and the guard are mounted to be adjustable relative to the plate 12. Thus there is provided rigid with the framework A a cross-bar 15, to which the end 11 is movably connected by guide pins or screws 16, entering slots in the bar, (see Fig. 6,) and the end 11, with the guard, is moved with respect to said bar by nuts 17, which embrace rods 18, rigid with and projecting from the cross-bar 15. The rods 18 pass through lugs 19, projecting from the end 11, and the adjusting-nuts 17, which are in pairs, are located on opposite sides of each lug, so that said end 11 may be adjusted positively in both directions.

It has been found in practice that in the movement of the pieces of matter from the receptacle there is a strong tendency in each piece to assume a position out of alinement or parallelism and thus be fed inaccurately, to prevent which there is provided a bearer or weight, represented by a vertical rod 20, mounted loosely in a guide 21, carried by the receptacle side 10, so that the lower end of the rod may rest with light pressure upon the rearward forward corner (when viewed as in Figs. 1, 4, and 11) of the pile of mail-matter in the receptacle to act as a means for slightly retarding the movement of one side of each piece of matter from the receptacle.

The separating and timing device C for the mail-matter preferably consists of two parts—a separating-roll 22 and a pair of coacting rolls 23 24. The separating-roll 22 consists of a roller, upon the periphery of which the free end of the plate 12 rests by gravity. This end of the plate is formed with a number of spaced fingers $12^a$, and the roller 22 has portions of its periphery underlying the fingers cut away, as at $22^a$, so as to present high and low parts under the fingers of the plate, and thus during the rotation of the roller to alternately allow the plate to fall by gravity to permit a feeding movement of the piece of matter resting on said plate and to raise or return the plate to its normal position, preventing the feeding of a piece of mail-matter. The portions of the roller 22 between the fingers of the plate 12 are not cut away so that when the plate falls into the cut-away portions directly underlying the fingers the uncut portions project above the plate to bear with sufficient frictional contact on the piece of matter in contact with the plate to move it outward from the receptacle through the open mouth provided for its passage between the lower end of the guard 14 and the then lowered plate. The feeding action of the roller 22 continues so long as the plate 12 is in its low position, which, as shown, is about the length of one half of the rotation of the roller, while in the remaining half of its rotation the high part of the roller raises the plate and with it the pieces of matter resting on it, so that the uncut portions of the roller between the fingers of the plate cannot touch the adjacent piece of mail-matter with sufficient frictional contact to impart any movement thereto, even should the guard 14 be yielding enough to permit a movement of the piece of matter. On the other hand, it is obvious that the raising of the plate may be simply sufficient to lessen the frictional contact between the roller and the lower piece of mail-matter, the end of the plate 12 being raised toward the guard 14 to close the mouth of the receptacle and the guard 14 be sufficiently rigid as to resist the passage of a piece of matter inadvertently. The separating-roller 22 thus acts as a timer to feed a piece of matter from the receptacle at a certain fixed time in its revolutions and is inactive at other times.

The coacting forwarding-rollers 23 24, forming the other part of the device C, are mounted just in advance of the roller 22, the high parts of the pair of rollers meeting at the bight simultaneous with or soon after the end of the piece of matter moved by the roller 22 arrives between them. The rollers 23 24 each consist of coacting high and low parts. During the coaction of the high parts thereof the piece of matter is moved, while during the coaction of the low parts no feeding movement occurs. The low or inactive parts of the rollers 23 24 are so disposed with relation to the feeding movement of the roller 22 that they present an open space for the entrance of the piece of matter fed by said roller 22, so that when the high or active parts thereof come into position the piece of matter already projected between them will be gripped and moved forward, the high parts of the rollers 23 24 acting after and immediately in succession to the feeding movement of the roller 22, the pair of rollers 23 24 thus acting alternately with the roller 22.

It is preferred to provide a head-gage 25, arranged to meet the leading end of the piece of matter fed by the roller 22, aline it properly with the axis of the rollers 23 24, and to stay its onward movement temporarily until the said rollers 23 24 or their active portions come into position to move the piece of matter forward. The head-gage 25 is arranged in the path of movement of the matter through the machine, and in the present embodiment of the invention is in position just forward of the bight of the high or active parts of the rollers 23 24, so as to stop the piece of matter with its leading end just beyond the line of bight of said rollers.

Figures 7, 8, 9, 10:
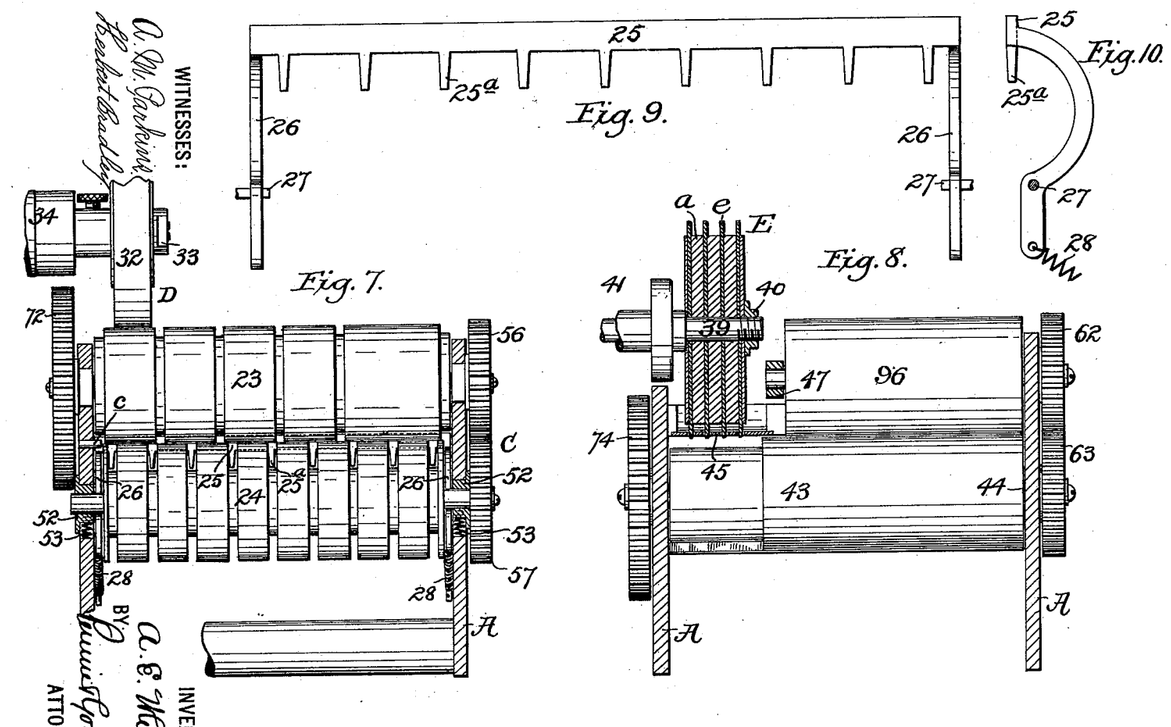
Fig. 7 is a cross-section on the line 7 7 of Fig. 4, the rolls and gears being shown in elevation.
Fig. 8 is a similar section on the line 8 8 of Fig. 4, the rolls and gears being shown in elevation.
Fig. 9 is an enlarged elevation of the front gage or stop removed from the machine.
Fig. 10 is a side elevation thereof.
Figure 14:
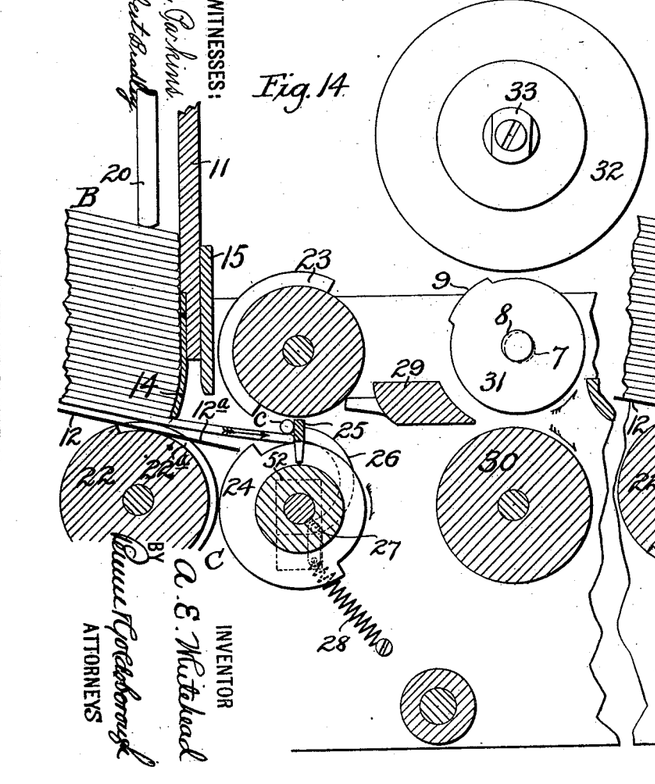
Figs. 14 and 15 are similar views showing different positions of the piece of matter being fed and of the feeding instrumentalities.
Figure 15:
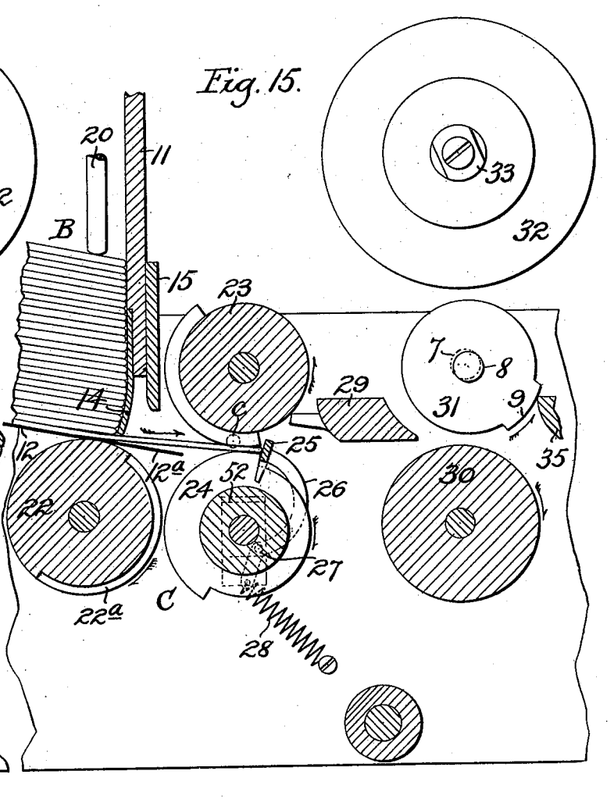

The head-gage 25 consists, as shown in Figs. 9 and 10, of a cross-bar extending between the sides of the framework of the machine and carried by the upper ends of a pair of levers 26, that are mounted on pivots 27, eccentric to the axis of the roller 24 and projecting in this instance from the boxes carrying the journals of said roller 24, the lower ends of said levers being connected to springs 28, tending to hold the head-gage cross-bar in normal position, as in Figs. 11 and 14. The head-gage is free to assume and remain in its normal active position during the passage of the low part of the roller 24 beneath it, ready to be met by the leading end of the piece of matter fed by the roller 22, but is moved or rocked away from the path of movement of the piece of matter against the tension of its springs 28 by the abutment of the leading end of the high part of said roller 24, which in the rotation of said roller will rock the head-gage downward out of the path of movement of the matter then being within the control of the rollers 23 24 and is held out of such path of movement during the feeding action of said rollers and then permitted to speedily return to its normal position by the action of the springs 28 as soon as the high part of said roller 24 passes the head-gage. The active face of the head-gage cross-bar 25 is extended by fingers 25$^a$, which extend into circumferential grooves in the roller 24, as in Fig. 7, so that the piece of matter is insured meeting it.

From the separating and timing device the piece of matter passes beneath an upper guide 29 and thence to the printing device D, between its impression-roll 30 and the printing-roll 31, of which said device in the main consists. The printing-roll carries on its periphery a marking die or surface 9, which bears characters, such as type or the like, to print or mark on the piece of matter any desired indication, such as in the case of mail-matter the post-office name, date, &c. The printing-roll is carried by a shaft 8, having a journal 7 (see Figs. 11, 13, 14, and 15) eccentric to the periphery of the roll, and the marking die or surface 9 is arranged at the greatest radius from the axis of the journal, so that it will be the only part of the roll that will bear upon the piece of matter on the impression-roller. This setting of the roller and its marking-die also adapts it to coact with an ink-roller 32, of any ordinary form, mounted above the printing-roll 31 in position to be met and inked by the ink-roller.

The ink-roller 32 is secured to a spindle 33, that is mounted in a proper bearing 34, (see Figs. 4 and 6,) rising from the framework, so as to rotate by the frictional contact of the printing-roll 31 therewith. The spindle 33 of the ink-roller is mounted in an eccentric sleeve 36, (see Fig. 2,) by turning which sleeve more or less in either direction in the bearing 34 the inking-roll may be adjusted with relation to the marking-surface of the printing-roll.

From the printing-roll 31 and impression-roll 30 the piece of matter passes forward under a bridge 35 and thence between a pair of feed-rollers 37 38, which, as will hereinafter appear, are positively driven, so as to carry the piece of matter forward to the stamp-canceling device, now to be described.

Figure 3:
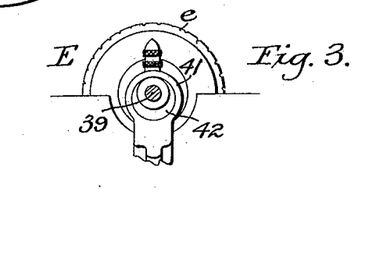
Fig. 3 is a detail of the means for vertically adjusting the canceling bur or tool.

From the feed-rollers 37 38 the piece of matter passes within the plane of action of the canceling device E, which in the present and preferred embodiment of the invention is made up or composed of a series of channeling, abrading, or cutting burs, disks, or tools $e$, separated a distance apart by spacing-washers $a$, (see Fig. 8,) of such diameter as to allow a more or less projection of the abrading-disks $e$ therefrom. The disks and spacing-washers are securely clamped upon a spindle 39, to rotate therewith, by means of a nut 40 and opposed shoulder on the spindle, and the latter is mounted in a suitable bracket 41, carried by the framework of the machine in such position that the abrading-disks of the canceling device directly overlie the path of movement of the pieces of matter through the machine. The spindle of the abrading-disks is directly carried by an eccentric sleeve 42, (see Fig. 3,) seated in the bracket, by means of which sleeve the abrading-disks may be adjusted relative to the surface of the piece of matter to be operated upon.

Coacting with the canceling device is an opposed bearer or support 43, the function of which is to properly support the piece of matter in position for its stamp to be abraded by the canceling device. To avoid the action of the abrading or canceling device upon the mail-matter for a distance longer than sufficient to cancel the length or width of the stamp or stamps thereon, the opposed support 43 is preferably an intermittently-acting one, such intermittent action being provided in the present instance by cutting away a portion of the periphery of the support. Thus the support is represented by a revoluble roll having only a portion of its circumference directly coacting with the canceling device of the full diameter of the roll, so that while the letter is passing between this full diameter portion and the canceling device the letter will be properly supported, with its surface or stamp held in such position as to be abraded or otherwise operated upon by the canceling device, and during the passage of the cut-away portion of the roll the letter or that portion of the letter directly beneath the canceling device will be unsupported, and thus no action of the canceling device thereon occur. The circumferential length of the full-diameter portion of the roll is suited to the extent of abrasion it is desired the canceling device should impart to the surface or stamp or stamps of the piece of matter moving below it; and in order to adapt the machine to cancel or abrade a varying number of stamps on the piece of matter the support 43 is made removable and interchangeable with other supports having circumferences of the full portion of the roll of greater or less extent; and for this purpose the shaft 44, on which the roll is mounted, may be made removable longitudinally from the roll, so that the roll may be removed from the machine, another roll put in its place, and the spindle returned in position to support the changed roll.

Of course many other modes of changing the roll may be adopted without departing from this invention.

In order to limit the extent of projection of the canceling device or the amount of surface of the canceling device that is exposed to the passing mail-matter and to guard the mail-matter from any undue or extreme action of the canceling device, there is associated with the canceling device a guard or grid 45 in the form of a plate underlying the canceling device and slotted longitudinally to permit the projection of a limited portion of the canceling or abrading disks through the plate. This plate is supported upon either side of the canceling device by suitable cross-bars 46, carried by the framework and by an intermediate bracket 47. This guard or grid also acts during the passage of the full portion of the roll 43 to keep the piece of matter down in firm contact with said roll and prevent the abrading-disks from abrading too deeply through the surface of the stamp or wrapper of the mail-matter.

The canceling device may be adjusted as it or its disks wear, and may also be adjusted to vary the depth through the stamp or material of the stamp or wrapper to which the channeling or abrasion may take place, it being obvious that the adjustment may be so delicate as to enable the canceling device to abrade only the upper film of the surface upon which it acts. Owing to this capacity for delicate adjustment, it is perfectly feasible to cause the canceling device to act only on the stamp and not on the remaining surface of the mail-matter.

From the canceling device and its coöperating support the now canceled piece of mail-matter may pass between a pair of delivering feed-rolls 49 50 and thence into a delivering-chute F, which may form a collecting-box for the delivered matter, or, as shown, be provided at its lower end with a discharge-mouth 51, through which each piece of mail-matter may pass into some other receptacle arranged for the purpose. The chute having the forward end, the pieces of matter delivered therein at considerable speed are stopped thereby, allowed to gravitate to the bottom of the chute, and then pass out through its discharge-mouth at a much reduced speed.

In the feeding of the pieces of mail-matter through the machine it is preferred when once the piece of matter to be canceled is fully within the control of the feeding instrumentalities of the machine, or is just about to be presented to the canceling device, that its upper surface or the surface which bears the stamp to be canceled shall occupy a constant fixed position—say horizontally—with respect to the active portion of the abrading surface or tool constituting the canceling device, and hence in the present embodiment of the invention the upper feed-roller 37 is mounted in fixed bearings, as, indeed, are the feed-roller 23, the printing-roller 31, and the delivery-roller 49. In order, however, that the machine may be adapted to feed pieces of matter of different thicknesses, the opposed roller or rollers of those mentioned—such as the feed-roller 38, the roller 43, the discharge feed-roller 50, the roller 30, and the feed-roller 24—are each mounted to yield vertically with respect to their coacting roller or device. Thus, as illustrated in Fig. 7 in connection with the roller 24, the journals of the shaft of the said roller are each mounted in a vertically-sliding box 52, mounted in guides in the framework and supported upon springs 53, which normally hold the roller in biting contact with the opposed roller, but permit the roller so mounted to yield with respect thereto according as the thickness of the passing matter may determine. While this yielding feature of the rolls 24, 30, 38, 43, and 50 is only shown in full with respect to the roll 24, it is to be distinctly understood that each of said rolls is similarly mounted, as indicated by dotted lines in Fig. 11.

In addition to the rolls already described it is preferred to provide a roll 54, mounted in axial alinement or substantial axial alinement with the printing-roll 31, (see Figs. 4 and 8,) the inner journal of this roll 54 being mounted in a bracket 55, supported by the framework or by the guides 29 35, which extend transversely between the side frames. There is also another roll 96, mounted above the roll 43 and coacting therewith, to carry the letter forward as it passes in the plane of action of the canceling device. The inner journal of this roll is supported in bearings in the bracket 47.

Figure 2:
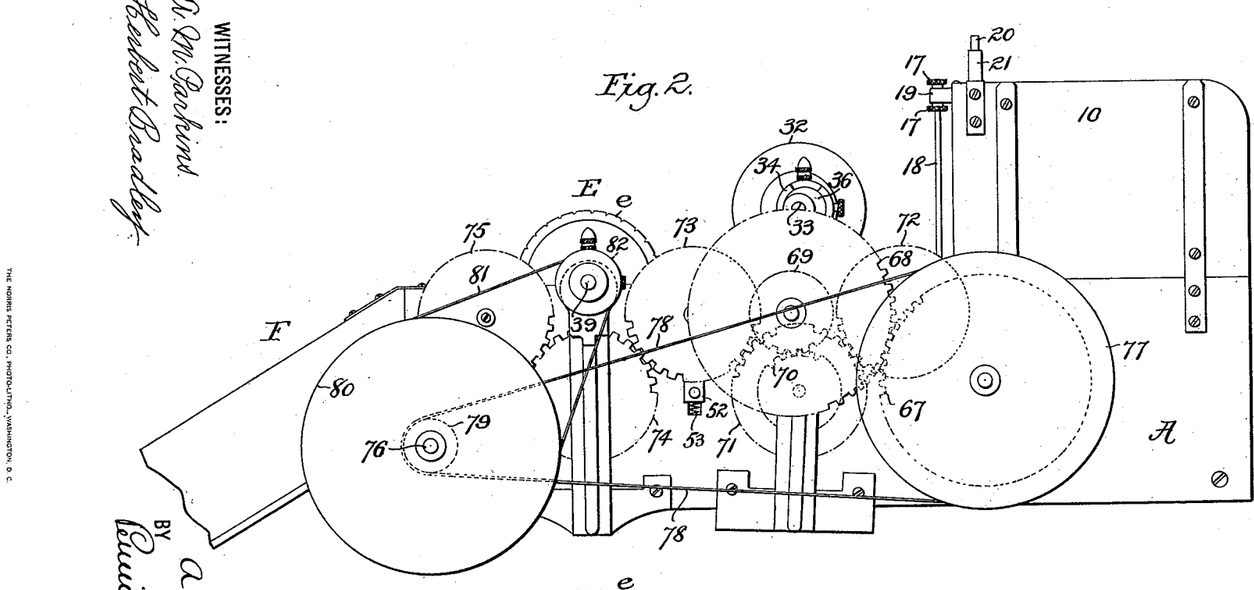
Fig. 2 is a similar view of the opposite side of the machine.

It is preferred that the several rolls shall be positively geared together in order that they may act in unison and in proper time, especially to effect the timely coöperation of the roll 43 in its support of the passing piece of mail-matter to the action of the abrading or canceling device with the time of feed of the sectional rolls 23 24. Thus the feed-rolls 23 24 have secured to their shafts the intermeshing gears 56 57, (see Fig. 1,) the roll 54 and coacting roll 30 provided with the intermeshing gears 58 59, the feed-rolls 37 38 with the intermeshing gears 60 61, the roll 96 and roll 43 with the gears 62 63, and the discharge feed-rolls 49 50 with the intermeshing gears 64 65, so that the rollers shall move with the same surface speed. The means of driving the different rolls of the present machine in timely relation with one another and at the proper speed is best seen in Figs. 2 and 4. Thus the shaft of the feed-roll 22 is provided with a driving-pulley 66, receiving a belt (not shown) driven by any suitable motor. The same shaft carries a gear 67, meshing with a gear 68, fast to the shaft of the printing-roll 31. This same shaft of the printing-roll carries a gear 69 in mesh with a gear 70, fast to the projecting end of the shaft of the roll 30, this same shaft having a toothed wheel 71 in mesh with a toothed wheel 72, fast to the shaft of the roller 23, and with a gear 73, fast to the shaft of the upper feed-roll 37. The latter gear 73 in turn is in mesh with the gear 74, carried by the shaft of the roll 43, and this latter gear is in mesh with the gear 75, carried by the shaft of the upper discharge-roll 49. In order to obtain the preferred high velocity of the canceling device a counter-shaft 76 is interposed between the driving-shaft and the spindle of the canceling device. Thus the driving-shaft carries a pulley 77, from which is stretched a belt 78 to a small pulley 79 on the counter-shaft, and on this counter-shaft is a larger pulley 80, from which is stretched a belt 81 around a small pulley 82, fast to the canceling-device spindle 39. It is to be understood that the speed of rotation of the canceling device is preferred to be very much higher than the speed of movement of the mail-matter through the machine in order to thus obtain a relatively smooth abrasion. So, also, the direction of rotation of the canceling device is preferably with the direction of movement of the mail-matter, which prevents the canceling device catching any projection on the mail-matter, tending to destroy it or affect its orderly passage through the machine.

Figure 16:
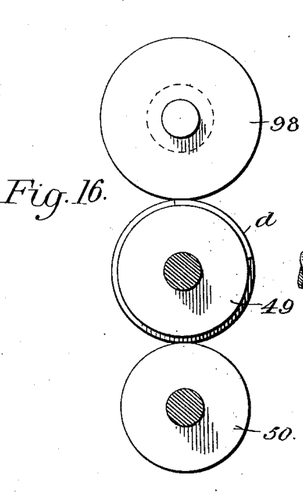
Figure 17:
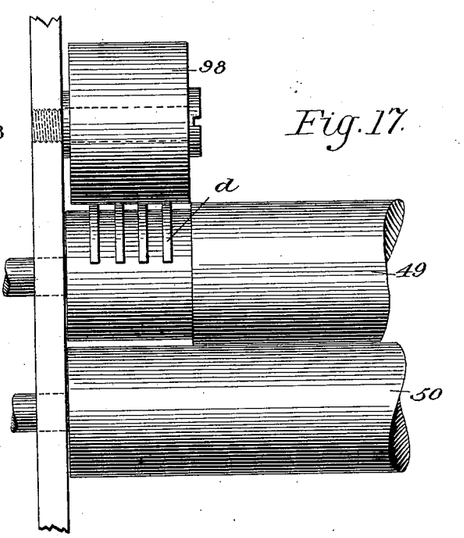
Fig. 17 is a side elevation, partly broken away, illustrating means for inking the abrasions made by the abrading-roll of the machine.

In the preferred embodiment of the invention the abrading-disks $e$ of the canceling device are made of emery of sufficient fineness that the abrading or tearing action upon the stamp to be canceled will not tend to destroy the wrapper inclosing the mail-matter. It is, however, entirely feasible to use other forms of abrading, cutting, or puncturing instruments or tools, such as steel burs of well-known form having toothed or serrated peripheries or of any other form capable of imparting a canceling mark or marks to the stamp. So far as other features of the present invention are concerned it is apparent that the abrading, cutting, puncturing, or channeling action of the canceling device may be absent and the disks of the canceling device arranged to apply inked lines to the stamp; and it is also obvious that the improved canceling device for channeling or abrading or otherwise destroying the surface of the stamp may be employed in connection with a marking device, such as projections $d$, carried by the roll 49, arranged with a suitable inking device—as, for instance, the inking-roll 98—to apply ink in the channels or abrasions formed in the stamp by the disks of the canceling device. The location of these projections $d$ is indicated in dotted lines in Fig. 4, and the general arrangement is shown in detail in Figs. 16 and 17.

Figure 18:
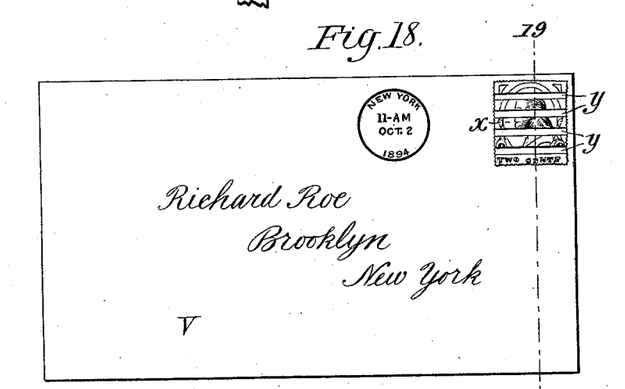
Fig. 18 is a face view of a piece of stamped mail-matter with the stamped canceled after the manner of this invention.
Figure 19:
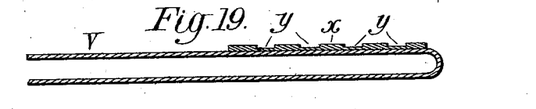
Fig. 19 is an enlarged cross-section of the same on the line 19 of Fig. 18.

In Figs. 18 and 19 are illustrated an envelop V, with its postage-stamp $x$ channeled or abraded or its surface removed on the parallel lines $y$. In this instance, as seen in Fig. 19, the canceling device has been so adjusted that only the upper film or surface of the stamp has been removed in separated places, still leaving a portion or lower film of the stamp adhering to the surface of the envelop, and in this manner all danger of the canceling device injuring the envelop is avoided.

What is claimed is—

1. In a stamp-canceling machine, the combination with an abrader, of feeding devices for carrying individual pieces of mail-matter, said feeding devices being so located with reference to the abrader that they will positively hold and progress the mail-matter past the abrader, during the abrading action.

2. In a stamp-canceling machine, the combination with an abrader, of date-marking mechanism, feeding devices for carrying individual pieces of mail-matter into contact with the abrader and the date-marker, said feeding devices being so located with reference to the abrader that they will positively hold and progress the mail-matter past the abrader, during the abrading action.

3. In a stamp-canceling machine, the combination with an abrader provided with means for determining and regulating the depth of the abrasion effected, of feeding devices for carrying individual pieces of mail-matter, said feeding devices being so located with reference to the abrader that they will positively hold and progress the mail-matter past the abrader, during the abrading action.

4. In a stamp-canceling machine, the combination with an abrader, of feeding devices for carrying individual pieces of mail-matter, said feeding devices being so located with reference to the abrader that they will positively hold and progress the mail-matter past the abrader, during the abrading action, and being further provided with timing and gaging mechanism to present the individual pieces of mail-matter *seriatim* and in proper alinement to the action of the abrader.

5. In a stamp-canceling machine, the combination with an intermittently-acting abrader, of continuously-acting feed-rollers so located with respect to the abrader as to positively hold and progress the mail-matter past the abrader, during the abrading action.

6. In a stamp-canceling machine, the combination with an abrader, consisting of a rotatory abrading bur or tool and an intermittently-coöperating bearer or support, of feeding devices for carrying individual pieces of mail-matter, said feeding devices being so located with reference to the abrader that they will positively hold and progress the mail-matter past the abrader, during the abrading action.

7. In a stamp-canceling machine, the combination with an abrader, consisting of a rotatory abrading bur or tool, an intermittently-coöperating bearer or support, and an intermediate grid for the abrading bur or tool, said feeding devices being so located with reference to the abrader that they will positively hold and progress the mail-matter past the abrader, during the abrading action.

8. In a stamp-canceling machine, the combination with an abrader, a mail-matter-supply receptacle, intermittently-acting separating mechanism for withdrawing and forwarding individual pieces of mail-matter from the receptacle, and continuously-acting feed-rollers receiving the mail-matter from said separating mechanism, and so located with respect to the abrader as to positively hold and progress the mail-matter past the abrader during the abrading action.

9. In a stamp-canceling machine, the combination with an abrader, a mail-matter-supply receptacle having a drop-bottom, a separator-roller, located beneath the drop-bottom and having high and low portions alternately raising and lowering the bottom so as to render the separator-roller alternately operative and inoperative, forwarding-rollers located in advance of the separator-roller, a gage for alining the individual pieces of mail-matter, located at the bite of the forwarding-rollers, and continuously-acting feed-rollers receiving the mail-matter from the forwarding-rollers and carrying it past the abrader.

10. In a stamp-canceling machine, the combination of a series of progressively-acting feeding devices, a continuously-moving bur or abrader, a coöperating support, and mechanism for intermittently moving said support into coöperation with the bur or abrader.

11. In a stamp-canceling machine, the combination of a bur or abrader, mail-matter-feeding devices, carrying and holding said matter into contact with said bur or abrader, and mechanism for moving said bur or abrader in the same direction as and at a greater speed than the feeding devices.

12. In a stamp-canceling machine, the combination with a mail-matter-supply receptacle, of intermittently-acting separating mechanism, an intermittently-acting abrader, and continuously-acting feeding devices for progressing the mail-matter uninterruptedly from the separating mechanism past the abrader.

13. In a stamp-canceling machine, the combination with an abrader, of an inking device located beyond the abrader and adapted to ink the abraded surface.

14. In a stamp-canceling or mail-marking machine, the combination with the mail-receptacle and its separating mechanism, of forwarding-rollers, one of which is provided with peripheral grooves, and a timing-gage coöperating with said forwarding-rollers, said gage comprising a cross-bar having depending fingers extending into the grooves.

In witness whereof I have hereunto signed my name in the presence of two witnesses.

ALFRED E. WHITEHEAD.

Witnesses:
GILBERT B. BRIGGS,
GILMER CROWELL.